Dec. 8, 1953  A. REYMANN  2,661,971
LATCHING MECHANISM
Filed July 15, 1948
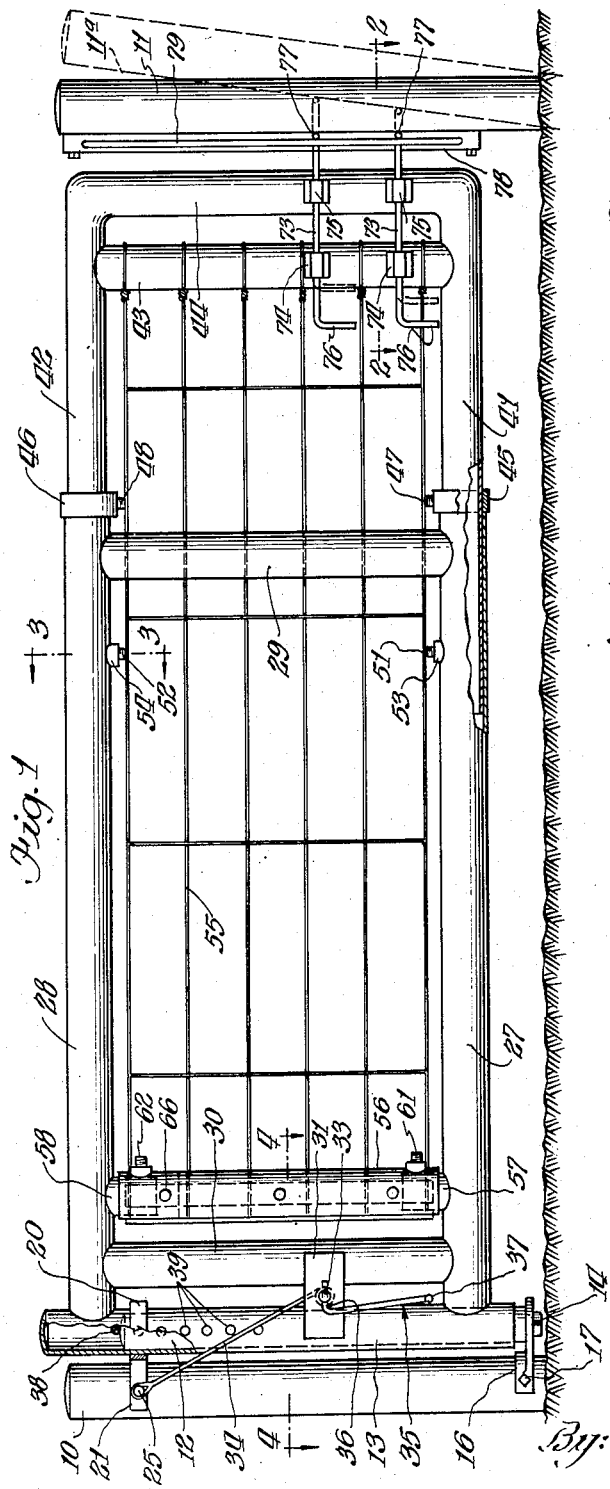
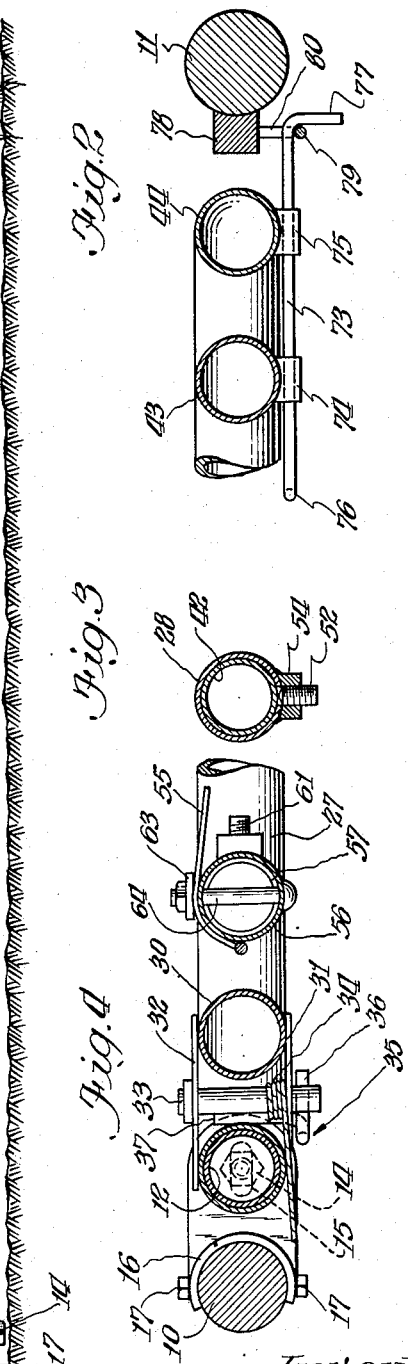
Inventor:
Alois Reymann
By: Clarence J. Loftus
Attorney.

Patented Dec. 8, 1953

2,661,971

UNITED STATES PATENT OFFICE 2,661,971

LATCHING MECHANISM

Alois Reymann, Sandwich, Ill.

Application July 15, 1948, Serial No. 38,820

2 Claims. (Cl. 292—57)

The present invention relates to gates, and this disclosure is a continuation in part of my copending application Serial No. 690,726, filed August 15, 1946, now Patent No. 2,563,960, issued August 14, 1951.

It is the general aim of the invention to provide a multi-purpose adjustable gate which is swingably supported in such a manner that it is capable of quick and easy adjustment as to heighth and suited to installations in gate openings of various widths, and is, at the same time, able to withstand excessive stresses without sagging.

In pursuance of this general aim, it is a primary object of the present invention to provide a gate barrier so designed and constructed that it is of variable length, but is entirely rigid in use, and not subject to sagging even when subjected to abnormal stresses.

A further object of the invention resides in the provision of improved means for raising and lowering the gate to adjust the heighth thereof and to maintain the gate at any elevation desired.

A further important object of the invention is the provision of a novel and improved gate retaining device that not only acts as a latch to hold the gate against swinging movement, but also acts as a positive connection between the swinging end of the gate and the gate post. The accomplishment of this object is of particular importance, since even in the event that excessive strains on the fence or the post should pull the post out of its normal vertical position, the gate cannot open.

In addition, it is a further object of the invention to provide a gate and latch structure wherein the foregoing objects are accomplished at any vertical position to which the gate may be adjusted, and wherein the parts are so designed that changes in the adjusted heighth of the gate may be made either when the gate is standing open or when it is closed and latched.

Further advances of the structure here disclosed over gates heretofore known in the art will be apparent from the following description taken in connection with the drawings of the specification, wherein:

Figure 1 is a front elevational view of an adjustable gate constructed in accordance with these teachings, certain parts of the gate frame having been broken away to show the internal construction thereof;

Figure 2 is a detail plan sectional view taken substantially on the plane of line 2—2 of Figure 1;

Figure 3 is a detail sectional view taken on the plane of the line 3—3 of Figure 1; and Figure 4 is a detail plan sectional view of the hinged end of the gate taken substantially on the plane of the line 4—4 of Figure 1.

In general the gate here disclosed comprises an adjustable barrier adapted to extend between a pair of gate posts 10 and 11. The supporting structure at the hinged end of the gate includes an upstanding tubular member 12 which is telescoped within the tubular member 13 of the gate frame. The bottom of the member 12 is adjustably secured to the gate post 10 by a nut and bolt 14 positioned in a slot 15 in a lower supporting bracket 16 (Figure 4). The bracket 16 may be secured to the gate post 10 in any convenient manner as by means of a pair of lag screws 17. The upper end of the tubular member 12 and the tubular member 13 of the gate frame are enclosed by a circular journal 20 which is in turn secured to a metal strap 21 at least partially surrounding the upper end of the gate post 10 and held in position by lag screws 25 on the opposite sides of the post.

The barrier of the gate includes lower and upper frame members 27 and 28, each of which are tubular in form and extend outwardly from the member 13 in parallel relationship to each other. These frame members 27 and 28 are open at their outer ends and are joined by a vertical outer frame member 29 and a vertical inner frame member 30 parallel with and closely adjacent to the outer tubular member 13 of the gate hinge. Members 13, 27, 28, 29 and 30 are preferably welded together so as to form a solid integral framework and, in the preferred construction, a pair of plates 31 and 32 are welded between the members 13 and 30 to provide a mounting for a winch spindle 33 on which a flexible cable 34 is wound. The cable 34 extends upwardly from the winch spindle 33 to one of the lag bolts 25 on the fence post 10, and the hand crank 35 is removably secured to one end of the spindle so that the gate may be raised or lowered by rotating the crank.

The crank 35 includes a lateral extension 36 extending through an opening in the end of the spindle 33, and the opposite end of the crank is provided with a handle portion 37 extending at a right angle to the extension 36 so that the crank will normally hang in the position shown, with the handle 37 extending inwardly between the members 30 and 13. The crank may be moved to its operating position by lifting the crank upwardly through half a revolution of pivotal movement on the extension 36 so that the handle portion 37 will project outwardly where it may be easily manipulated. Thus to raise the gate structure to any desired heighth it is only necessary to operate the crank until the winch spindle 33 takes up enough of the flexible cable 34 to raise the gate frame to the position desired. The gate is then held in position by inserting a cross pin 38 in any one of a row of openings 39 in the vertical member 13 so that the pin 38 will come to bear against the upper end of the upstanding member 12 and hold the gate at the precise level desired.

The gate includes an extension frame consisting of a lower slide 41 and an upper slide 42 telescoped in the frame members 27 and 28, respectively, and joined at their outer ends by the frame members 43 and 44. The members 41, 42, 43 and 44 may be welded together to function as a single unit and are preferably provided with a pair of collars 45 and 46 having set screws 47 and 48 to lock the collars in position on the slides. These adjustable collars limit the inward movement of the extension frame into the main frame of the barrier and the slides are additionally locked in place by set screws 51 and 52 threaded in bosses 53 and 54 in the frame members 27 and 28. These bosses, or stub shafts, are positioned at points closely adjacent the vertical frame member 38. The tube 56 is rotatable on the bosses, but can be locked in any desired position by set screws 61 and 62. The end of the fence wire 55 is secured to the tube 56 in any convenient manner, as by a clamping bar 63 and bolts 64, and the tube is provided with a number of openings 66 so that a lever may be inserted in the tube to rotate the tube on the bosses 57 and 58 and thus tighten the wire fence between the extension frame and the tube. It is thus seen that the tube not only acts as a tightening device, but may function as a fence reel on which enough wire fencing may be wound to permit full extension of the gate when desired.

The gate is provided with retaining means which serve not only to hold the gate against swinging movement, but also to firmly couple the gate and adjoining fence post together; so that the gate does not become unlatched even if extraordinary strains imposed on the fence post should pull it out of vertical position. To this end the gate is preferably provided with a pair of slide bars 73 extending between mounting brackets 74 and 75 on the members 43 and 44, respectively, and having the straight portion of each of the slide bars considerably longer than the space between the brackets so that each bar is mounted for both sliding and turning movements. The inner end of each of the bars includes a handle portion 76, the weight of which normally causes it to hang directly downwardly so that it will normally hold the lateral extensions 77 in horizontal position. The outward end of the slide bars is adapted to engage and couple with a keeper consisting of a relatively long vertical rail 78 and a retaining bar 79; the retaining bar being attached to the rail near its upper and lower ends and extending parallel with the surface of the rail, so as to define a relatively long vertical slot 80 through which the outer ends of the slide bars 73 may be passed.

In operation, the hook portions 77 may be moved to engaged position by manually raising the handles 76 to a horizontal position and sliding the bars 73 outwardly to pass the hooks through the slot 80. The handle portions 76 are then released, whereupon gravity will cause them to swing downwardly, turning the bars 73 and engaging the hook portions 77 behind the vertical bar 79. By this means, the gate is not only held against swinging movement, but is positively coupled to the gate post. Thus, even in the event that excessive stresses on the fence should pull the gate post 11 to the dotted line position 11a, the gate would not become unlatched. Instead, the slides 73 would merely move outwardly with the movement of the post. Even in the event that the post should tend to move a distance greater than the length of travel of the slides, the gate will not unlatch, since when the slides 73 reach the limit of their movement, the engagement of the hooked ends 77 of the slides with the vertical bar 79 of the keeper continues to hold the parts in coupled relationship and give sufficient support to the gate post to prevent further tilting.

From the foregoing it will be apparent that the teachings of this invention accomplish important practical advantages over previously known gate structures in several respects. A gate as here disclosed is not only capable of spanning a wide gate-way and of maintaining itself in true horizontal position without sagging, but in addition may be easily adjusted as to heighth and conveniently maintained in any position of vertical adjustment. The width of the gate is also readily adjustable, and it will be seen that gates constructed according to these teachings may be manufactured in only one or two standard sizes, yet may be adapted to fit any width of gate opening within a wide range. The length of the gate frame is easily adjusted merely by the manipulation of the set screws and locking collars, while the wire fence span carried by the gate is conveniently adjusted by manipulation of the fence reel 56. The latching structures of the gate here disclosed enjoy important advantages over devices previously used for the purpose, since they not only prevent swinging movement of the gate but positively couple the gate to the gate post so that each reinforces the other in the event of excessive strains on the gate or fence. In addition, all of the foregoing advantages are accomplished in a structure that is inherently simple, yet strong, rugged and well suited to prolonged use without the necessity of any maintenance or service operations.

It may be called to attention that the precise form of gate illustrated in the drawings is a preferred embodiment, selected as being well suited to a description of the inventive concept herein. It is recognized, however, that it is subject to numerous modifications and variations without sacrifice of all of the advantages inherent therein, and it is accordingly pointed out that the scope of the inventive concept extends to any structural variations coming within the terms of the appended claims.

Having thus described the invention, what I claim as new and desire to protect by United States Letters Patent is:

1. A gate latch fastening means for an adjustable gate having a first post, means pivotally mounting said gate on said first post, a second post and means for adjusting the length of the gate toward and away from said second post; said gate latch comprising a keeper consisting of said second post having a retaining bar parallel to the rail but spaced therefrom and defining a relatively long, narrow vertical slot in said keeper; and a bolt assembly comprising at least one mounting bracket with a horizontal slide bar carried thereby; and mounted for limited longitudinal sliding movement in said bracket and limited rotation on its axis whereby the slide bar may be moved longitudinally and its forward end projected into said slot of the keeper at any point intermediate the ends thereof the forward end portion of said longitudinal slide bar having a right angled lateral extension of a length greater than the width of the slot in the keeper whereby it may be projected through said slot only when the projection is in substantially vertical position and may be rotated to a substantially horizontal position wherein it is held in engagement behind the retaining bar of said keeper; together with manual means to rotate the slide bar and bring the lateral extension thereof into vertical position to pass through the slot in said keeper, and means to maintain the lateral extension thereof in horizontal position and in engagement with the retaining bar; said last named means comprising a handle extending outwardly from the slide bar and disposed at a right angle to the lateral extension thereof, whereby the weight of the handle will cause it to swing downwardly and hold the lateral extension in horizontal engaged position, said handle being normally spaced from said bracket when in latching position whereby to allow for different sized gate openings.

2. A gate latch fastening means for an adjustable gate having a first post, means pivotally mounting said gate on said first post, a second post and means for adjusting the length of the gate toward and away from said second post; said gate latch comprising a keeper consisting of said second post having a retaining bar parallel to the rail but spaced therefrom and defining a relatively long, narrow vertical slot in said keeper; and a bolt assembly comprising at least one mounting bracket with a horizontal slide bar carried thereby; and mounted for limited longitudinal sliding movement in said bracket and limited rotation on its axis whereby the slide bar may be moved longitudinally and its forward end projected into said slot of the keeper at any point intermediate the ends thereof the forward end portion of said longitudinal slide bar having a right angled lateral extension of a length greater than the width of the slot in the keeper whereby it may be projected through said slot only when the projection is in substantially vertical position and may be rotated to a substantially horizontal positon wherein it is held in engagement behind the retaining bar of said keeper; together with manual means to rotate the slide bar and bring the lateral extension thereof into vertical position to pass through the slot in said keeper, and means to maintain the lateral extension thereof in horizontal position and in engagement with the retaining bar, said manual means being normally spaced from said bracket when in latching position whereby to allow for different sized gate openings.

ALOIS REYMANN.

References Cited in the file of this patent
UNITED STATES PATENTS

| Number | Name | Date |
| --- | --- | --- |
| 72,120 | Thompson | Dec. 10, 1867 |
| 366,264 | Skellenger | July 12, 1887 |
| 473,548 | Farwell | Apr. 26, 1892 |
| 777,135 | Parsons | Dec. 13, 1904 |
| 961,778 | John | June 21, 1910 |
| 1,385,889 | Roberts | July 26, 1921 |
| 1,508,029 | Segal | Sept. 9, 1924 |